US012794118B2

(12) United States Patent
Zuniga-Juarez

(10) Patent No.: US 12,794,118 B2
(45) Date of Patent: Nov. 10, 2026

(54) ULTRA-WIDEBAND ANTENNA

(71) Applicant: Taoglas Group Holdings Limited, Enniscorthy (IE)

(72) Inventor: Jose Eleazar Zuniga-Juarez, Ensenada (MX)

(73) Assignee: Taoglas Group Holdings Limited, Enniscorthy (IE)

( * ) Notice: Subject to any disclaimer, the term of this patent is extended or adjusted under 35 U.S.C. 154(b) by 16 days.

(21) Appl. No.: 18/222,459

(22) Filed: Jul. 16, 2023

(65) Prior Publication Data

US 2024/0063532 A1 Feb. 22, 2024

Related U.S. Application Data

(63) Continuation of application No. 17/394,094, filed on Aug. 4, 2021, now Pat. No. 11,705,626, which is a continuation of application No. 16/291,318, filed on Mar. 4, 2019, now Pat. No. 11,088,442, which is a continuation of application No. 15/298,932, filed on Oct. 20, 2016, now Pat. No. 10,283,854, which is a continuation-in-part of application No. 14/438,611, filed as application No. PCT/US2013/063947 on Oct. 8, 2013, now Pat. No. 9,502,757.

(60) Provisional application No. 61/711,196, filed on Oct. 8, 2012.

(51) Int. Cl.

*H01Q 1/38* (2006.01)
*H01Q 1/24* (2006.01)
*H01Q 5/371* (2015.01)
*H01Q 7/00* (2006.01)
*H01Q 9/06* (2006.01)
*H01Q 9/42* (2006.01)
*H01Q 21/28* (2006.01)

(52) U.S. Cl.

CPC ............... *H01Q 1/38* (2013.01); *H01Q 1/243* (2013.01); *H01Q 5/371* (2015.01); *H01Q 7/00* (2013.01); *H01Q 9/065* (2013.01); *H01Q 9/42* (2013.01); *H01Q 21/28* (2013.01)

(58) Field of Classification Search

None

See application file for complete search history.

(56) References Cited

U.S. PATENT DOCUMENTS 6,281,848 B1 * 8/2001 Nagumo ............. H01Q 9/0421 343/702
6,320,545 B1 * 11/2001 Nagumo ................. H01Q 1/36 343/702
6,596,634 B2 7/2003 Umetsu et al.

(Continued)

FOREIGN PATENT DOCUMENTS

CN 201440454 4/2010
CN 201994418 9/2011

(Continued)

*Primary Examiner* — Dameon E Levi
*Assistant Examiner* — Anh Ho
(74) *Attorney, Agent, or Firm* — Garson & Gutierrez, PC

(57) ABSTRACT

An antenna system capable of operating among all LTE bands, and also capable of operation among all remote side cellular applications, such as GSM, AMPS, GPRS, CDMA, WCDMA, UMTS, and HSPA among others. The antenna system provides a low cost alternative to active-tunable antennas suggested in the prior art for the same multi-platform objective.

19 Claims, 15 Drawing Sheets

(56) References Cited

U.S. PATENT DOCUMENTS

| | | | |
|---|---|---|---|
| 6,657,593 B2 | 12/2003 | Nagumo et al. | |
| 6,740,582 B2 | 5/2004 | Siniaguine | |
| 6,812,549 B2 | 11/2004 | Umetsu et al. | |
| 7,115,972 B2 | 10/2006 | Dotta et al. | |
| 7,276,780 B2 | 10/2007 | Dotta et al. | |
| 7,345,650 B2 | 3/2008 | Bae et al. | |
| 8,216,934 B2 | 7/2012 | Yoshida et al. | |
| 8,350,764 B2 * | 1/2013 | Rao | H01Q 1/243 343/702 |
| 8,373,599 B2 | 2/2013 | Lin et al. | |
| 8,779,988 B2 | 7/2014 | Yang et al. | |
| 8,970,436 B2 | 3/2015 | Yang | |
| 9,502,757 B2 | 11/2016 | Zuniga | |
| 9,755,310 B2 | 9/2017 | Quinlan | |
| 11,088,442 B2 | 8/2021 | Zuniga-Juarez | |
| 2002/0030626 A1 * | 3/2002 | Nagumo | H01Q 1/38 343/702 |
| 2002/0126049 A1 | 9/2002 | Okabe et al. | |
| 2002/0163470 A1 * | 11/2002 | Nagumo | H01Q 11/20 343/702 |
| 2004/0027287 A1 * | 2/2004 | Onaka | H01Q 1/243 343/702 |
| 2006/0131691 A1 | 6/2006 | Roozeboom et al. | |
| 2007/0205948 A1 | 9/2007 | Lee et al. | |
| 2008/0291099 A1 * | 11/2008 | Qi | H01Q 9/0407 343/741 |
| 2009/0128416 A1 | 5/2009 | Cheng | |
| 2009/0243937 A1 | 10/2009 | Humphrey et al. | |
| 2010/0301485 A1 | 12/2010 | Sekine et al. | |
| 2011/0156964 A1 * | 6/2011 | Lin | H01Q 1/243 343/702 |
| 2011/0193226 A1 | 8/2011 | Kirby et al. | |
| 2012/0092220 A1 | 4/2012 | Tani et al. | |
| 2012/0169555 A1 * | 7/2012 | Tsou | H01Q 5/364 343/749 |
| 2014/0232608 A1 | 8/2014 | Zhao | |
| 2018/0233814 A1 | 8/2018 | Zuniga-Juarez | |

FOREIGN PATENT DOCUMENTS

| | | | | |
|---|---|---|---|---|
| CN | 201994418 U * | 9/2011 | | |
| CN | 202042593 | 11/2011 | | |
| CN | 102544754 | 8/2015 | | |
| EP | 1770826 | 4/2007 | | |
| EP | 3154125 | 4/2017 | | |
| JP | 3528737 B2 * | 5/2004 | | |
| SU | 1665422 | 7/1991 | | |
| TW | 520583 B * | 2/2003 | H01Q 21/24 | |
| TW | M459541 | 8/2013 | | |
| TW | 201405936 | 2/2014 | | |
| TW | 201417399 | 5/2014 | | |
| TW | 201714353 | 10/2015 | | |
| TW | 201714354 | 10/2015 | | |
| WO | 1998019337 | 5/1999 | | |
| WO | 2004112189 | 12/2004 | | |
| WO | 2014058923 | 4/2014 | | |

* cited by examiner

ULTRA-WIDEBAND ANTENNA

PRIORITY AND CROSS-REFERENCE TO RELATED APPLICATIONS

This application is a continuation of, and claims the benefit of priority to, U.S. patent application Ser. No. 17/394,094 filed Aug. 4, 2021 of the same title, which is a continuation of, and claims the benefit of priority to, U.S. patent application Ser. No. 16/291,318 filed Mar. 4, 2019 of the same title, which is a continuation of, and claims the benefit of priority to, U.S. patent application Ser. No. 15/298,932 filed Oct. 20, 2016 and entitled "LOW-COST ULTRA WIDEBAND LTE ANTENNA", which is a continuation-in-part of, and claims the benefit or priority to, U.S. patent application Ser. No. 14/438,611 filed May 1, 2015 and entitled "LOW-COST ULTRA WIDEBAND LTE ANTENNA", which is a national stage entry of, claims the benefit or priority to PCT/US13/63947 filed Oct. 8, 2013 and entitled "LOW-COST ULTRA WIDEBAND LTE ANTENNA", which claims the benefit or priority to U.S. Provisional Patent Application Ser. No. 61/711,196 filed Oct. 8, 2012, the contents of each of which are hereby incorporated by reference herein.

This application is related to U.S. Ser. No. 15/922,582, filed Mar. 15, 2018, now U.S. Pat. No. 10,135,129 which is also a continuation of U.S. Ser. No. 15/298,932, filed Oct. 20, 2016, the contents of which are hereby incorporated by reference.

TECHNICAL FIELD

This invention relates to antennas for wireless communications; and more particularly, to such antennas configured for wide band operation over LTE, GSM, AMPS, GPRS, CDMA, WCDMA, UMTS, and other frequency bands.

BACKGROUND ART

Wireless communications span a number of individualized cellular networks throughout various parts of the world. Combined, these networks service over one billion subscribers. With the development of modern wireless technology, wireless communications have evolved from first generation (1G) networks, including Advanced Mobile Phone System (AMPS) and European Total Access Communication System (ETACS), to 2G networks, including United States Digital Cellular (USDC), General Packet Radio Service (GPRS) and Global Systems for Mobile (GSM), and 3G networks, including Code Division Multiple Access (CDMA 2000) and Universal Mobile Telecommunications System (UMTS). More recently, industry trends are moving toward 4G networks, including Worldwide Interoperability for Microwave Access (WiMAX) and Long Term Evolution (LTE).

As mobile wireless device become equipped to operate within modern 4G networks, antennas of such devices will be required to operate over associated frequency bands.

Moreover, with continuous evolution of wireless networks, subscriber regions are being developed with a priority aimed at advancing high-demand regions. Thus, all over the world a variety of networks exist with different operating requirements among individual regions.

This disparity in technologies between networks gives rise to a number of problems, including: (i) manufacturer's being required to design different internal antenna systems to adapt a particular device for operation within a desired subscriber region or associated technology; and (ii) subscriber devices being limited to operation within a particular subscriber region or associated technology such that subscribers may not use a device across multiple networks.

More recently, antenna systems have been provided for use within multiple subscriber regions and various wireless platforms. These wide band antennas generally utilize switches and active tuning components, such as variable capacitors, for tuning the associated antenna frequency for operation among the various bands.

SUMMARY

Technical Problem

Many prior art antennas are limited in that they are not capable of operation with a plurality of wireless platforms, for example among LTE networks in different countries.

Those antennas designed for ultra-wideband operation among a plurality of modern LTE and other wireless platforms require relatively expensive componentry, such as switches and active tuning components, for tuning the antenna to work among the multiple platforms or within a plurality of subscriber networks.

Solution to the Problem

The named inventors have designed a 2G/3G/4G capable and high efficiency surface mountable ceramic antenna designed to cover all LTE bands, and also being capable of operation among all remote side cellular applications, such as GSM, AMPS, GPRS, CDMA, WCDMA, UMTS among others, without using switches or active components; the antenna resulting in a low cost ultra-wideband LTE antenna.

Advantageous Effects of the Invention

The claimed antenna is capable of operating among all LTE bands, and also capable of operation among all remote side cellular applications, such as GSM, AMPS, GPRS, CDMA, WCDMA, UMTS, and HSPA among others.

The antenna provides a low cost alternative to active-tunable antennas suggested in the prior art for the same multi-platform objective.

The antenna provides high efficiency in small size of up to 40 mm×6 mm×5 mm. A comparative metal, FR4, FPC, whip, rod, helix antenna would be much less efficient in this configuration for the same size due to the different dielectric constants. Very high efficiency antennas are critical to 3G and 4G devices ability to deliver the stated data-speed rates of systems such as HSPA and LTE.

The ground plane of the antenna has an optimal size of 107 mm×45 mm, as the evaluation board. However the antenna can be used for smaller ground planes with very good results compared to conventional ultra-wideband antennas.

The ceramic and fiberglass options eliminate the need for tooling and NRE fees inherent in traditional antenna designs. This means the range is available "off the shelf" at any quantity. Features allowing the antennas to be tuned on the customer side during integration speed up the design cycle dramatically.

The antenna is more resistant to detuning compared to other antenna integrations. If tuning is required it can be tuned for the device environment using a matching circuit or other techniques. There is no need for new tooling, thereby reducing costs if customization is required.

The antenna is highly reliable and robust. The antenna meets all temperature and mechanical specs required by major device and equipment manufacturers (vibration, drop tests, etc.).

The antenna has a rectangular shape, which is easy to integrate in to any device. Other antenna designs come in irregular shapes and sizes making them difficult to integrate.

The antenna is a surface-mountable device (SMD) which provides reduced labor costs, cable and connector costs, leads to higher integration yield rates, and reduces losses in transmission.

The antenna mounts directly on a periphery of a device main-board.

Transmission losses are kept to absolute minimum resulting in much improved over the air (OTA) total radiated power (TRP)/total isotropic radiation (TIS) device performance compared to similar efficiency cable and connector antenna solutions, thus being an ideal antenna to be used for devices that need to pass network approvals from major carriers.

Reductions in probability of radiated spurious emissions compared to other antenna technologies are observed when using the antenna in accordance with the preferred embodiment disclosed herein.

The antenna achieves moderate to high gain in both vertical and horizontal polarization planes. This feature is very useful in certain wireless communications where the antenna orientation is not fixed and the reflections or multipath signals may be present from any plane. In those cases the important parameter to be considered is the total field strength, which is the vector sum of the signal from the horizontal and vertical polarization planes at any instant in time.

The antenna can achieve efficiencies of more than 50% over all bands with an average efficiency over all bands of more than 60%.

The antenna return loss is better than 5 dB over all frequency bands having a good antenna match.

DESCRIPTION OF EMBODIMENTS

An antenna is described which is capable of operating among all LTE bands, and also capable of operation among all remote side cellular applications, such as GSM, AMPS, GPRS, CDMA, WCDMA, UMTS, and HSPA among others.

The antenna provides a low cost alternative to active-tunable antennas suggested in the prior art for the same multi-platform objective. The low cost is achieved by designing the antenna with trace elements capable of operating over the desired wireless platforms and without requiring switches or tunable components.

Although an example of the antenna is disclosed herein, it will be recognized by those having skill in the art that variations may be incorporated without departing from the spirit and scope of the invention.

Example 1

Figure 1A:
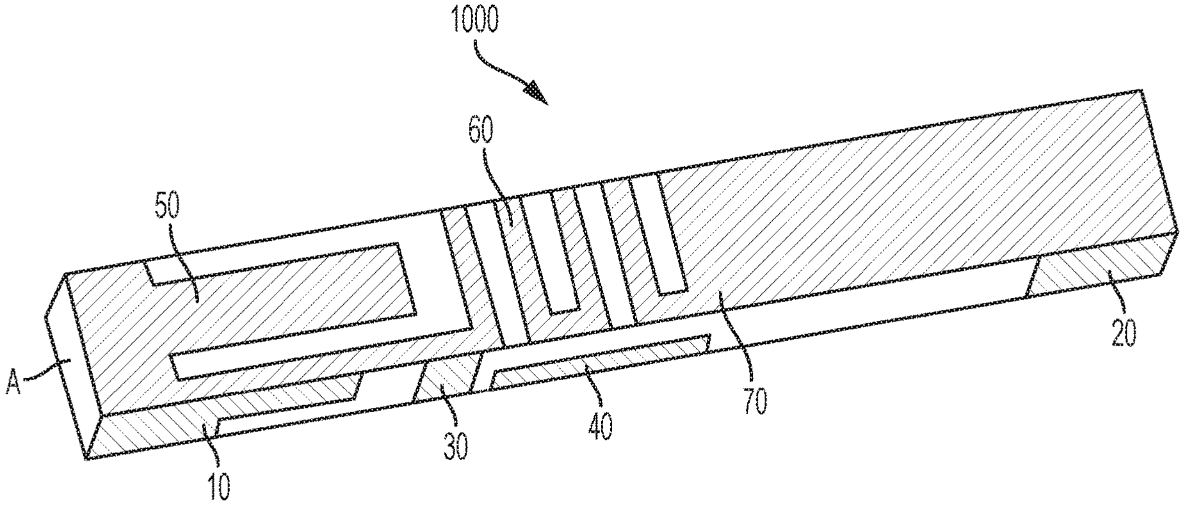
FIG. 1A shows a bottom perspective view of the antenna, including a substrate volume and conductive trace elements disposed about a bottom surface, rear surface and right surface thereof.

Now turning to the drawings:

FIG. 1A shows a bottom perspective view of the antenna 1000, including a substrate volume and conductive trace elements disposed about a bottom surface, rear surface and right surface thereof.

The antenna comprises a bottom surface having a bottom connection element 10 disposed at a right terminus of the bottom surface; a second bottom conductor plate 20 disposed at a left terminus of the bottom surface; a feed conductor 30 disposed between the bottom connection element and the second bottom conductor plate; and a ground conductor 40 disposed between the feed conductor and the second bottom conductor plate.

For purposes herein, the term “right terminus” means an end of a respective surface selected from the bottom, rear, top, and rear surfaces, wherein the end is adjacent to a right side of the substrate. Thus, when looking at the front surface, the right terminus is on the right side; however, when looking at the rear surface the right terminus is on the left side (mirror opposite).

For purposes herein, the term “left terminus” means an end of a respective surface selected from the bottom, rear, top, and rear surfaces, wherein the end is adjacent to a left side of the substrate.

The antenna further comprises a rear surface having a high frequency element 50 disposed at a right terminus of the rear surface; a low frequency element 70 disposed at a left terminus of the rear surface; and a first loop conductor 60 disposed between the high and low frequency elements.

The right surface of the substrate does not contain trace elements.

Figure 1B:
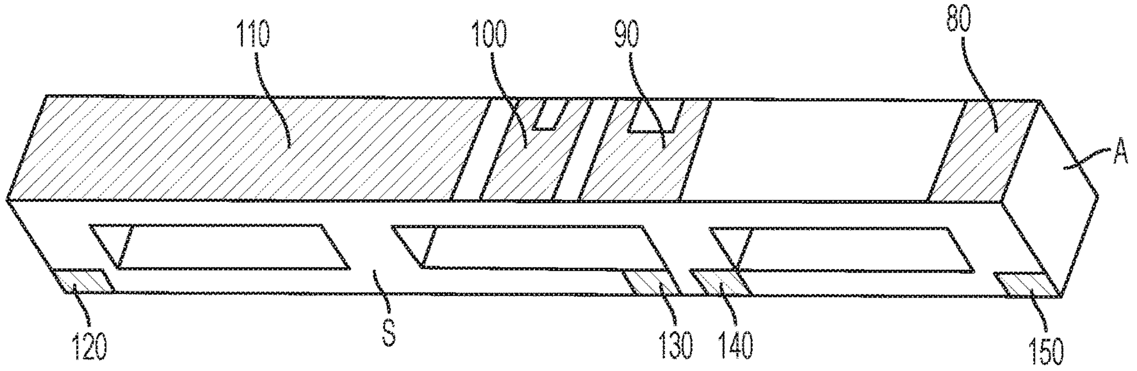
FIG. 1B shows a top perspective view of the antenna, including a substrate volume and conductive trace elements disposed about a top surface, front surface and right surface thereof.

FIG. 1B shows a top perspective view of the antenna; including a substrate volume and conductive trace elements disposed about a top surface, front surface and right surface thereof (the left surface is a mirror image of the right surface and is not shown).

The antenna comprises a top surface having a first top plate 80 disposed at a right terminus of the top surface; a second top plate 110 disposed at a left terminus of the rear surface; a second loop conductor 90 disposed between the first and second top plates; and a third loop conductor 100 disposed between the second top plate and the second loop conductor.

The antenna further comprises a front surface having a plurality of front pads, including a first front pad 120, a second front pad 130, a third front pad 140 and a forth front pad 150.

Figure 1C:
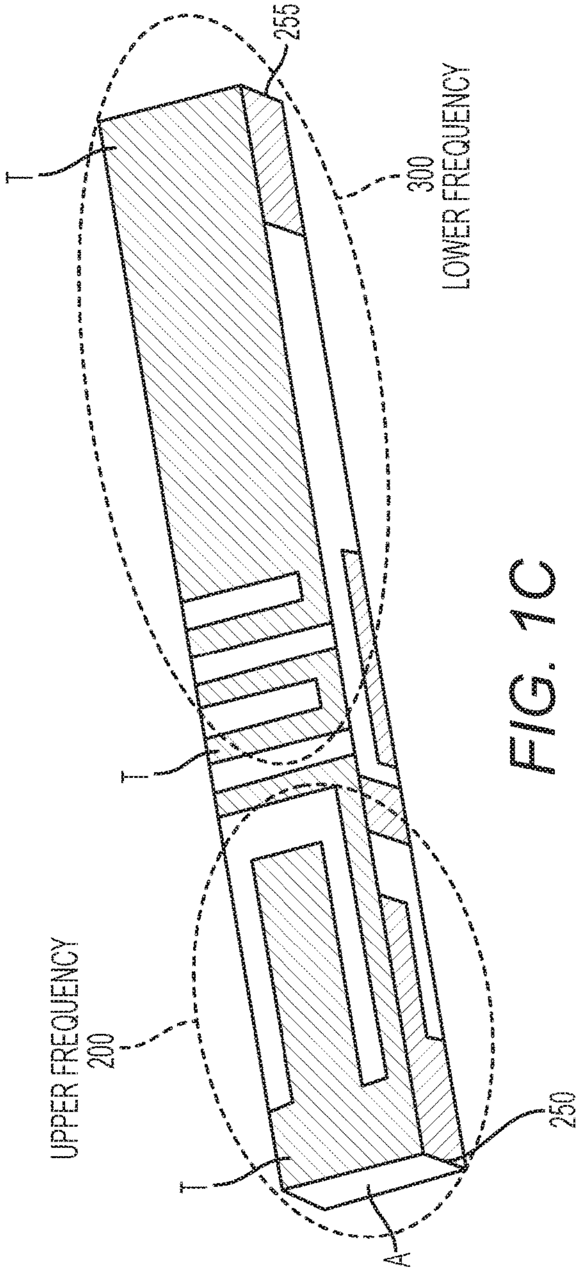
FIG. 1C shows bottom perspective view of the antenna detailing a high frequency portion and a low frequency portion thereof.

FIG. 1C shows bottom perspective view of the antenna detailing a high frequency portion 200 and a low frequency portion 300 thereof.

Also shown is a right terminus 250 of the rear surface; and a left terminus 255 of the rear surface. A right surface of the substrate is labeled “A”.

Figure 1D:
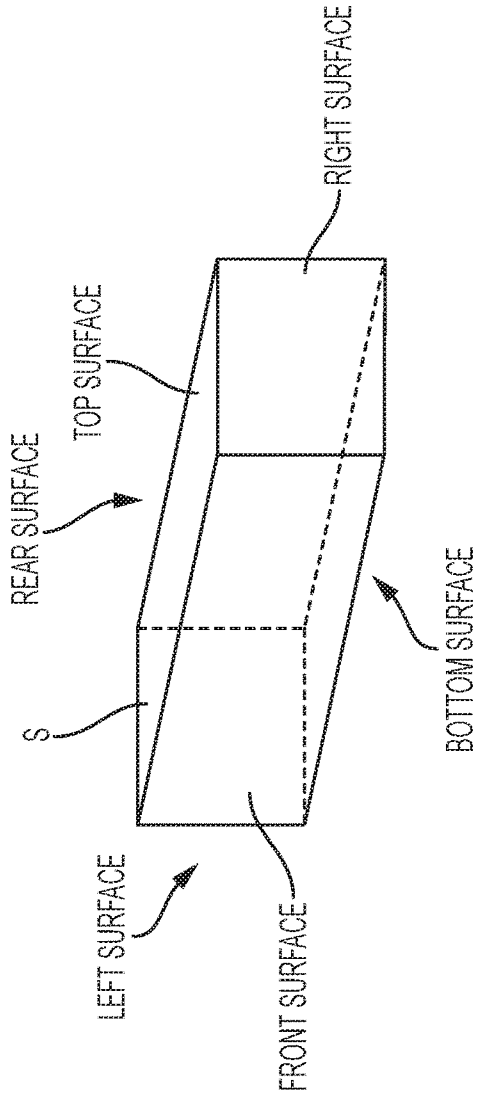
FIG. 1D shows a three dimensional substrate volume having a bottom, rear, top, front, right and left surface, respectively.

FIG. 1D shows a three dimensional substrate volume having a bottom, rear, top, front, right and left surface, respectively. The substrate volume is labeled as “S”.

The substrate volume further comprises several peripheral edges, including: a bottom-rear periphery forming an edge between the bottom surface and the rear surface of the substrate, labeled as B-R' throughout the drawings; a bottom-front periphery forming an edge between the bottom surface and the front surface of the substrate, labeled as B-F' throughout the drawings; a top-rear periphery forming an edge between the top surface and the rear surface of the substrate, labeled as T-R' throughout the drawings; and a top-front periphery forming an edge between the top surface and the front surface of the substrate, labeled as T-F' throughout the drawings.

Figure 2A:
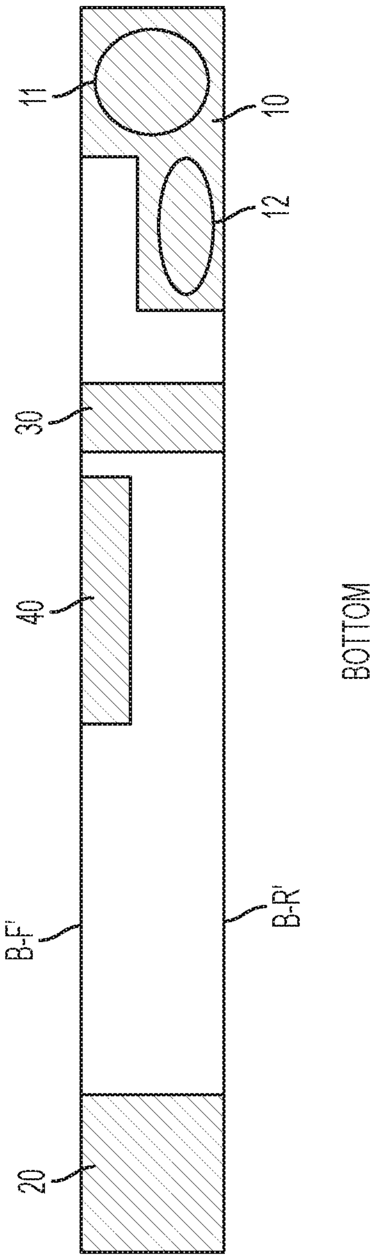
FIG. 2A shows a bottom plan view of the antenna illustrating trace elements disposed on a bottom side of the substrate volume.

FIG. 2A shows a bottom plan view of the antenna illustrating trace elements disposed on a bottom side of the substrate volume.

The bottom surface of the antenna comprises a bottom connection element 10 disposed at a right terminus of the bottom surface; a second bottom conductor plate 20 disposed at a left terminus of the bottom surface; a feed conductor 30 disposed between the bottom connection element and the second bottom conductor plate; and a ground conductor 40 disposed between the feed conductor and the second bottom conductor plate.

The bottom connection element 10 further comprises a first bottom conductor plate 11 disposed at a right terminus of the bottom surface, and a first conductive element 12 extending from the first bottom conductor plate along the bottom-rear periphery B-R'.

Each of the feed conductor, bottom connection element and second bottom conductor plate extends from the bottom-rear periphery B-R' to the bottom-front periphery B-F'.

The ground conductor is disposed along the bottom-front periphery B-F'.

Figure 2B:
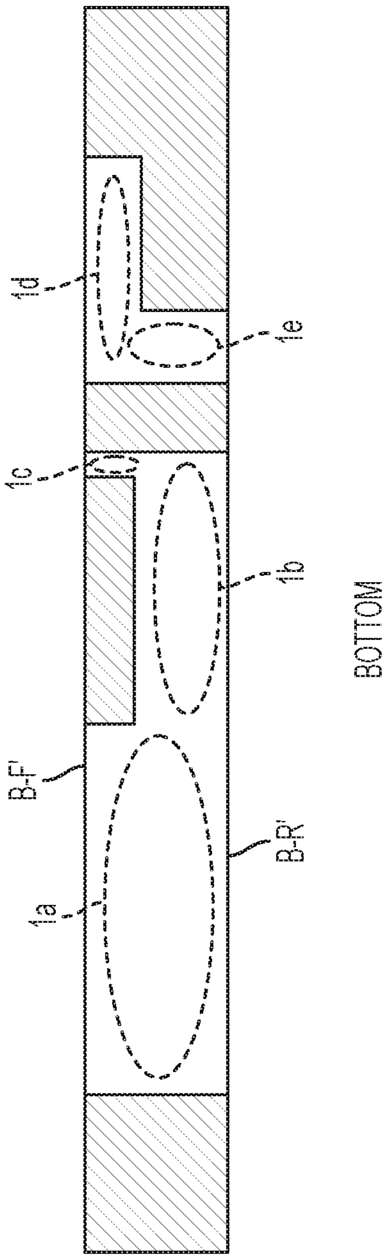
FIG. 2B shows a bottom plan view of the antenna illustrating a plurality of bottom gaps disposed between the trace elements on the bottom side.

FIG. 2B shows a bottom plan view of the antenna illustrating a plurality of bottom gaps disposed between the trace elements on the bottom side.

The second bottom conductor plate 20 is separated from the ground conductor 40 by a first bottom gap 1*a* extending therebetween.

The ground conductor 40 is separated from the bottom-rear periphery B-R' by a second bottom gap 1*b*, and is further separated from the feed conductor 30 by a third gap 1*c* extending therebetween.

The first conductive element 12 is separated from the bottom-front periphery B-F' by a fourth gap 1*d* extending therebetween.

Finally, the first conductive element 12 is separated from the feed conductor 30 by a fifth gap 1*e* extending therebetween.

Figure 3A:
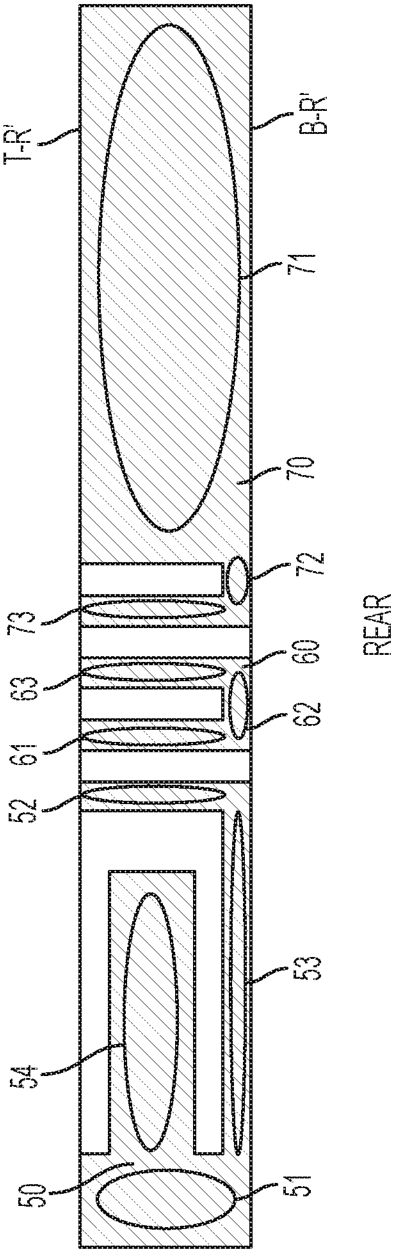
FIG. 3A shows a rear plan view of the antenna illustrating trace elements disposed on a rear side of the substrate volume.

FIG. 3A shows a rear plan view of the antenna illustrating trace elements disposed on a rear side of the substrate volume.

The rear surface of the antenna comprises a high frequency element 50 disposed at a right terminus of the rear surface; a low frequency element 70 disposed at a left terminus of the rear surface; and a first loop conductor 60 disposed between the high and low frequency elements.

The high frequency element 50 further comprises a first vertical conductor plate 51 disposed at the right terminus of the rear surface; and a first connection element 53 extending from the first vertical conductor plate along the bottom-rear periphery B-R' of the substrate. A second conductor element 54 extends from the first vertical conductor plate parallel with the first connection element.

A first vertical conductor element 52 extends perpendicularly from the first connection element spanning an area between the bottom-rear periphery B-R' and the top-rear periphery T-R' of the substrate.

The first loop conductor 60 further comprises a first vertical portion 61 and a second vertical portion 63, each extending from the bottom-rear periphery B-R' and the top-rear periphery T-R' of the substrate. A first loop connection 62 extends between the first and second vertical portions along the bottom-rear periphery.

The low frequency element 70 further comprises a second vertical conductor plate 71 disposed at a left terminus of the rear surface; a second vertical conductor element 73 spanning an area between the bottom-rear periphery B-R' and the top-rear periphery T-R' of the substrate; and a second connection element 72 extending between the second vertical conductor plate and the second vertical conductor element along the bottom-rear periphery B-R' of the substrate.

Figure 3B:
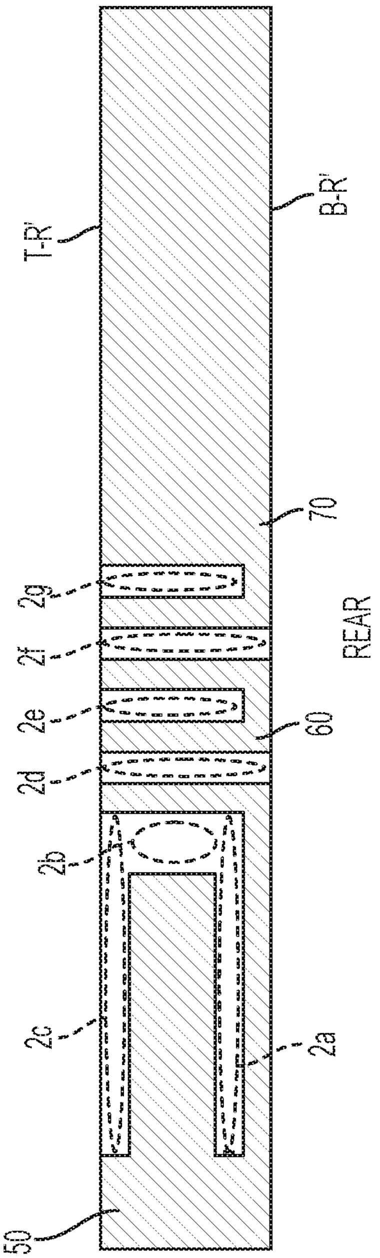
FIG. 3B shows a rear plan view of the antenna illustrating a plurality of rear gaps disposed between the trace elements on the rear side.

FIG. 3B shows a rear plan view of the antenna illustrating a plurality of gaps disposed between the trace elements on the rear side.

The first connection element 53 is separated from the second conductor element 54 by a first rear gap 2*a* extending therebetween. The second conductor element is further separated from the first vertical conductor element 52 by a second rear gap 2*b* extending therebetween, and separated from the top-rear periphery T-R' by a third rear gap 2*c* extending therebetween.

The first vertical conductor element 52 is separated from the first vertical portion 61 of the first loop conductor by a fourth rear gap 2*d* extending therebetween. The fourth rear gap extends from the bottom-rear periphery B-R' to the top-rear periphery T-R' of the substrate. The first vertical portion is further separated from the second vertical portion 63 of the first loop conductor 60 by a fifth rear gap 2*e* extending therebetween. The fifth rear gap extends from the top-rear periphery to the first loop connection 62.

The second vertical portion 63 of the first loop conductor 60 is further separated from the second vertical conductor element 73 of the low frequency element 70 by a sixth rear gap 2*f* extending therebetween. The sixth rear gap spans an area between the bottom-rear periphery B-R' and the top-rear periphery T-R' of the substrate in between the second vertical conductor element and the second vertical portion.

Finally, the second vertical conductor element 73 of the low frequency element 70 is separated from the second vertical conductor plate 71 by a seventh rear gap 2*g* extending therebetween. The seventh rear gap extends from the top-rear periphery to the second connection element 72.

Figure 4A:
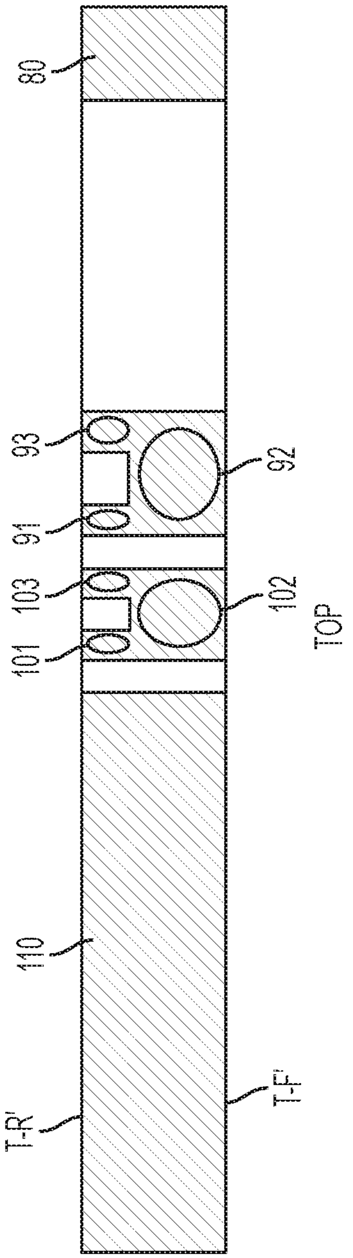
FIG. 4A shows a top plan view of the antenna illustrating trace elements disposed on a top side of the substrate volume.

FIG. 4A shows a top plan view of the antenna illustrating trace elements disposed on a top side of the substrate volume.

The top surface of the antenna comprises a first top plate 80 disposed at a right terminus of the top surface; a second top plate 110 disposed at a left terminus of the rear surface; a second loop conductor 90 disposed between the first and second top plates; and a third loop conductor 100 disposed between the second top plate and the second loop conductor.

The second loop conductor 90 further comprises a second loop plate 92 disposed along the top-front periphery T-F' of the substrate; and a pair of second loop connection elements 91; 93 each extending from the second loop plate to abut the top-rear periphery T-R'.

The third loop conductor 100 further comprises a third loop plate 102 disposed along the top-front periphery T-F' of the substrate; and a pair of third loop connection elements 101; 103 each extending from the third loop plate to abut the top-rear periphery T-R'. Each of the first and second top plates spans an area between the top-rear periphery T-R' and the top-front periphery T-F' of the substrate.

Figure 4B:
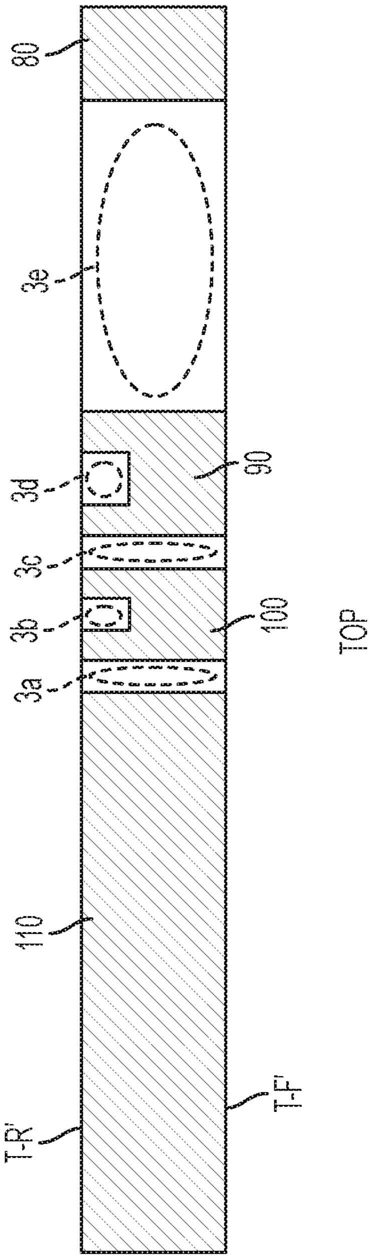
FIG. 4B shows a top plan view of the antenna illustrating a plurality of top gaps disposed between the trace elements on the top side.

FIG. 4B shows a top plan view of the antenna illustrating a plurality of gaps disposed between the trace elements on the top side. The second top plate 110 is separated from the third loop conductor 100 by a first top gap 3*a* extending therebetween from the top-rear periphery T-R' to the top-front periphery T-F' of the substrate. The second loop connection elements 91; 93 are separated by a second top gap 3*b* extending therebetween along the top-rear periphery.

The second loop conductor 90 is separated from the third loop conductor 100 by a third top gap 3*c* extending therebetween from the top-rear periphery T-R' to the top-front periphery T-F' of the substrate.

The third loop connection elements 101; 103 are separated by a fourth top gap 3*d* extending therebetween along the top-rear periphery.

The first top plate 80 is separated from the second loop conductor 90 by a fifth top gap 3*e* extending therebetween from the top-rear periphery T-R' to the top-front periphery T-F' of the substrate.

Figure 5A:
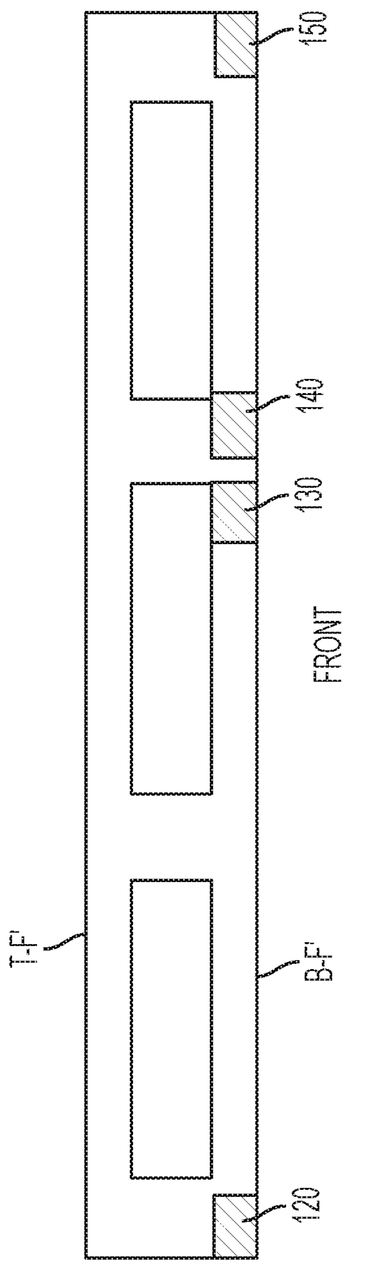
FIG. 5A shows a front plan view of the antenna illustrating trace elements disposed on a front side of the substrate volume.

FIG. 5A shows a front plan view of the antenna illustrating trace elements disposed on a front side of the substrate volume.

The front surface of the antenna comprises a plurality of front pads, including a first front pad 120 disposed at the left terminus of the front surface, a second front pad 130, a third front pad 140 and a forth front pad 150 disposed at the right terminus of the rear surface. Each of the plurality of front pads is disposed along the bottom-front periphery B-F'.

The substrate volume has a height measuring between the bottom surface and the top surface; a width measured between the front surface and rear surface; and a length measured between the left-side surface and right-side surface.

Figure 5B:
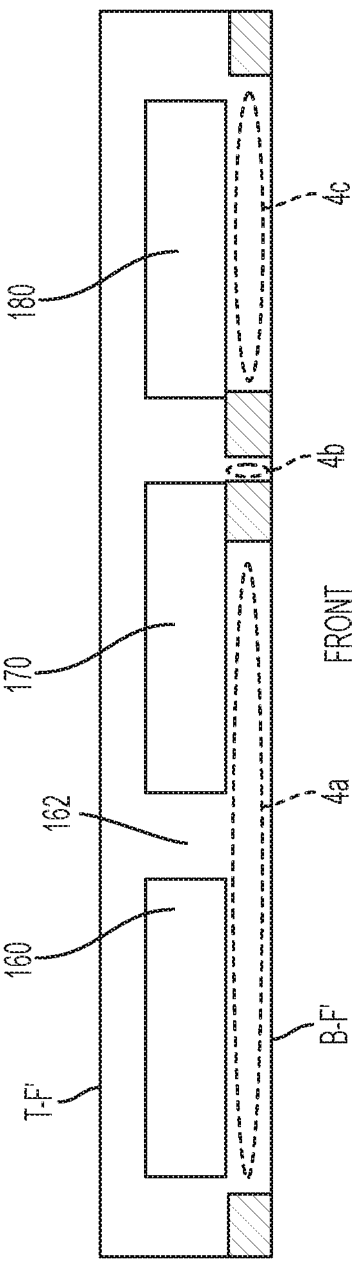
FIG. 5B shows a front plan view of the antenna illustrating a plurality of front gaps disposed between the trace elements on the front side.

FIG. 5B shows a front plan view of the antenna illustrating a plurality of front gaps disposed between the trace elements on the front side. A first front gap 4*a* spans an area between the first front pad 120 and the second front pad 130. A second front gap 4*b* spans an area between the second front pad 130 and the third front pad 140. A third front gap 4*c* spans an area between the third front pad 140 and the fourth front pad 150. The substrate comprises a plurality of three-dimensional voids extending into the substrate volume from the front surface of the substrate; including a first void 160; a second void 170; and a third void 180. A first three-dimensional void is separated from another three-dimensional void by a rib, for example rib 162 between first void 160 and second void 170. Though the antenna has been described it is important to describe a circuit board and antenna system configured for use with the antenna.

Figure 6:
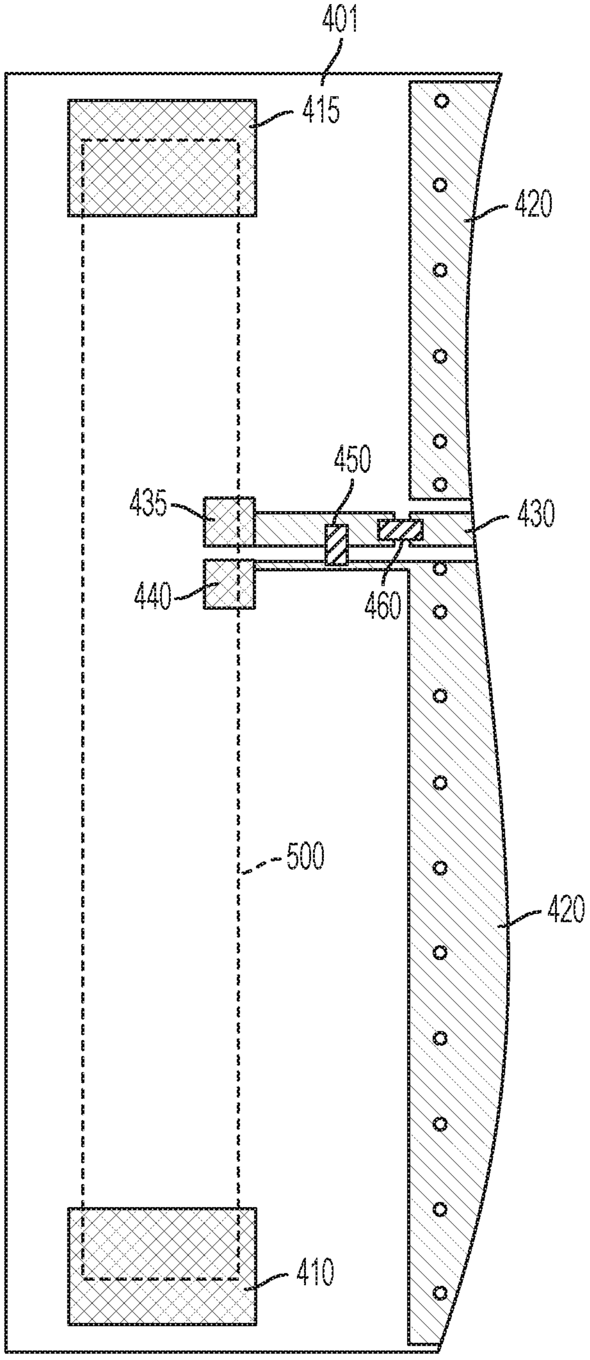
FIG. 6 illustrates a circuit board and antenna system architecture configured for use with the antenna.

FIG. 6 illustrates a circuit board and antenna system architecture configured for use with the antenna. The antenna system comprises an antenna as described above coupled to a circuit board 401 having an antenna footprint 500 spanning an area between a first solder patch 410 and a second solder patch 415. The feed conductor of the antenna is configured to connect to a feed solder pad 435. The ground conductor of the antenna is configured to connect with a ground solder pad 440. The ground solder pad is further coupled to a ground trace leading to a ground plane 420. The ground trace can be tuned against the feed line by a first matching component 450 extending therebetween. The feed solder pad is further coupled to a feed line 430 with a second matching component 460 disposed thereon.

Figure 7:
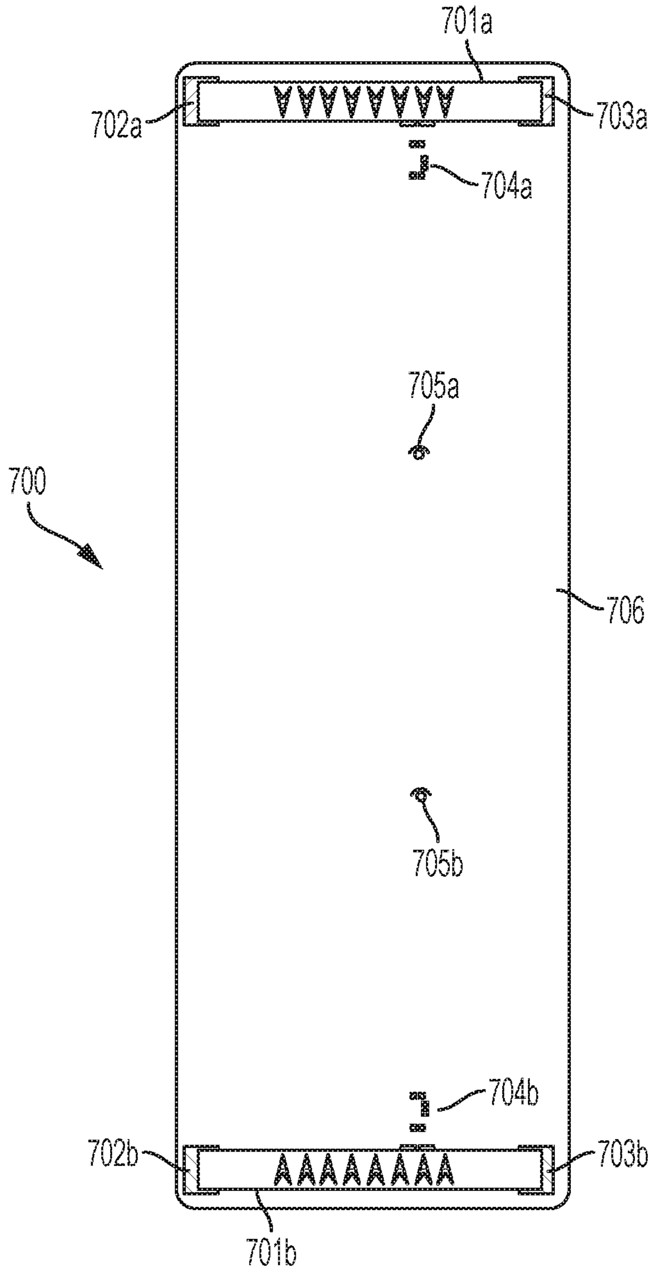
FIG. 7 shows a top view of an antenna system including two antennas; a second of the two antennas configured as a mirror image of the first and positioned on opposite sides of a substrate for improved performance.

FIG. 7 shows a top view of an antenna system 700 including two antennas 701*a*; 701*b*; a second of the two antennas 701*b* is configured as a mirror image of the first antenna 701*a* and positioned on opposite sides of a substrate 706 for improved performance. In accordance with the embodiment shown in FIG. 7, a substrate 706 is provided having a longitudinal length wherein a first of two antennas 701*a* is disposed at a first end of the substrate and wherein a second of the two antennas 701*b* is disposed at a second end of the substrate opposite the first end. As shown, the first and second antennas are configured as mirror images; i.e. the trace patterns are opposite one another in a mirrored orientation. In a preferred example, a first of the antennas may include an antenna as described in FIGS. 1-6, and the second antenna may be configured with a trace pattern or arrangement that is the mirror image of the first antenna. Each of the antennas 701*a*; 701*b* is coupled to the substrate 706 via solder pads 702(*a/b*); 703(*a/b*), respectively. The substrate 706 further comprises feed portions 704*a*, and 704*b*, wherein each of the feed portions is configured to receive a soldered cable feed for coupling with the respective antennas. It should be noted that feed portions 704*a* and 704*b* may further include one or more matching components, such as inductors, capacitors and the like. The matching components can be soldered at the feed portions, particularly at the point of introducing the feed to the antenna. An opposite end of the soldered cable feed (generally a wire or cable, not shown) for each antenna is further connected to the pins 705*a* and 705*b*, respectively, which extend through the substrate by through vias to couple with a pair of coaxial cable connectors (See FIG. 8), one coaxial cable connector per each antenna.

The substrate can be flexible, allowing the antenna system to be bent about a housing or folded over as desired by the manufacturer. Alternatively, the substrate can comprise a rigid FR4 type substrate.

Figure 8:
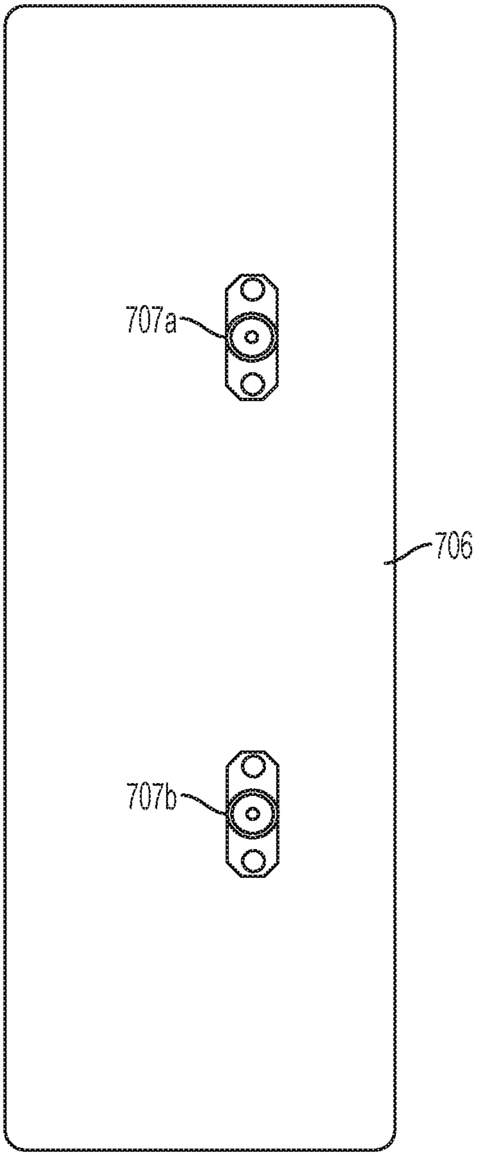
FIG. 8 shows a bottom view of the antenna system of FIG. 7, wherein coaxial cable connectors are positioned on the reverse side of the antenna substrate.

FIG. 8 shows a bottom view of the antenna system of FIG. 7, wherein coaxial cable connectors are positioned on the reverse side of the antenna substrate. The coaxial cable connectors 707*a*; 707*b* are shown positioned on the bottom side of the substrate 706.

Figure 9:
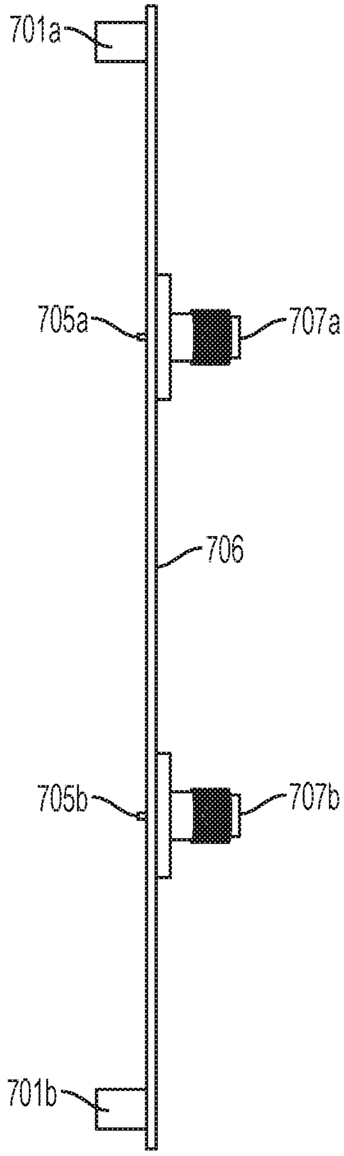
FIG. 9 shows a side view of the antenna system of FIGS. 7-8.

FIG. 9 shows a side view of the antenna system of FIGS. 7-8. The features of the antenna system described in FIGS. 7-8 are further illustrated from the side view.

Figure 10:
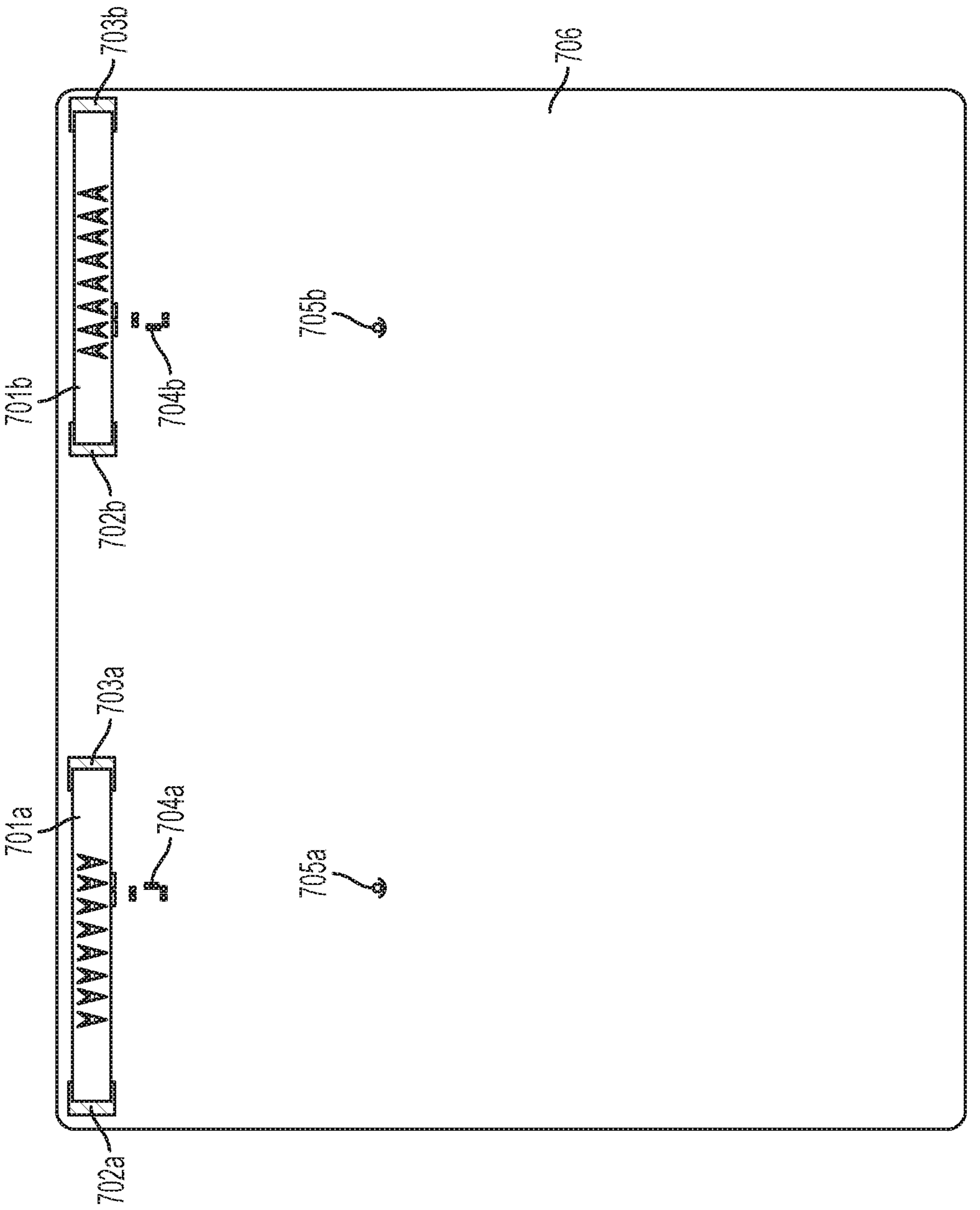
FIG. 10 shows a top view of an antenna system, in accordance with yet another embodiment, including two antennas; a second of the two antennas configured as a mirror image of the first and positioned on opposite sides of a substrate along a common peripheral edge thereof in linear relation.

FIG. 10 shows a top view of an antenna system in accordance with yet another embodiment, the antenna system including two antennas 701*a*; 701*b*, respectively; a second of the two antennas 701*b* is configured as a mirror image of the first 701*a* and positioned on opposite sides of a substrate 706 along a common peripheral edge thereof in linear relation. The antennas are each coupled to the substrate at solder pads 702(*a/b*) and 703(*a/b*), respectively as shown. Each antenna includes a feed portion (first feed portion 704*a*; second feed portion 704*b*) and a corresponding pin 705*a*; 705*b*; wherein a wire or cable is used to couple one of the pins with one of the feed portions. The pins extend through the substrate as through vias and connect with coaxial cable connectors on the bottom side of the substrate (See FIG. 11).

Figure 11:
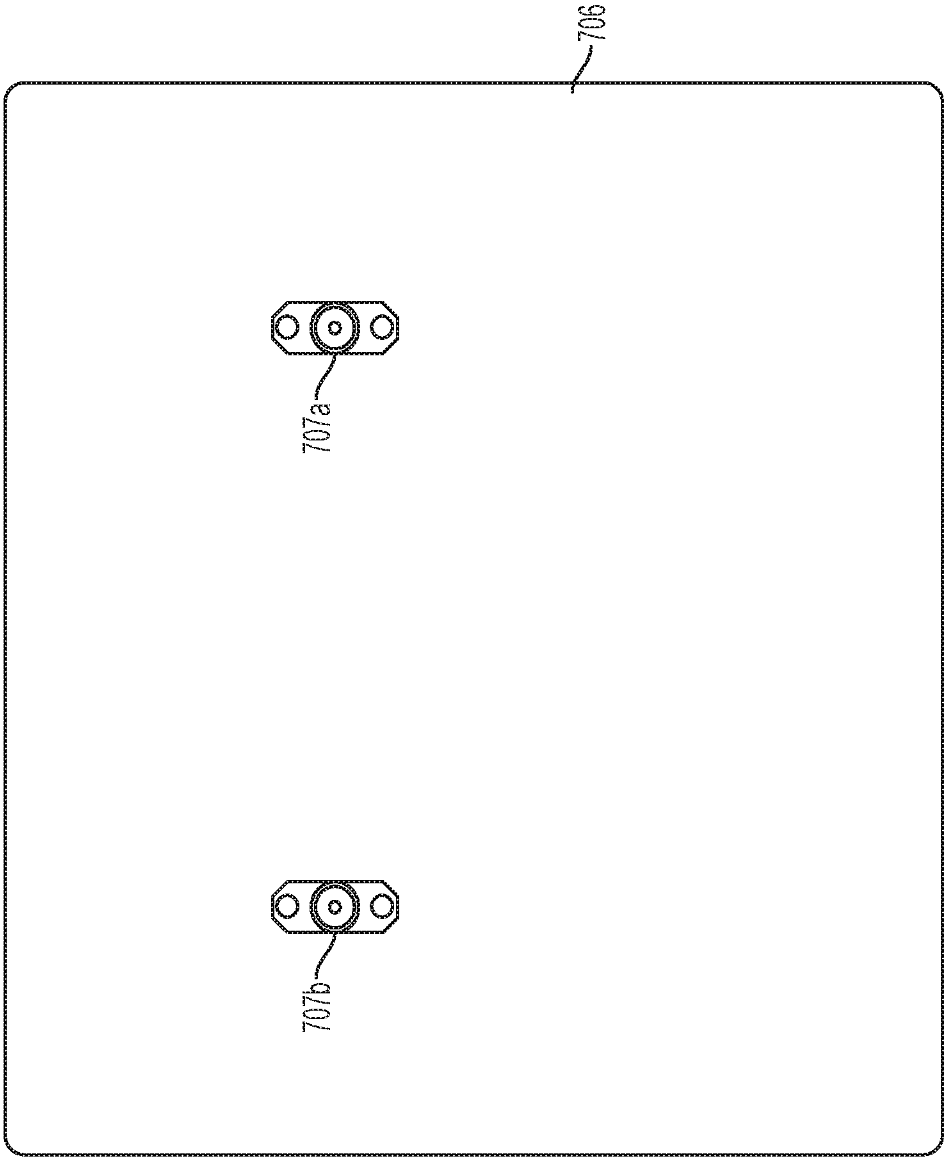
FIG. 11 shows a bottom view of the antenna system of FIG. 10, wherein coaxial cable connectors are positioned on the reverse side of the antenna substrate.

FIG. 11 shows a bottom view of the antenna system of FIG. 10, wherein coaxial cable connectors 707*a*; 707*b*, respectively, are positioned on the reverse side of the antenna substrate 706.

Figure 12:
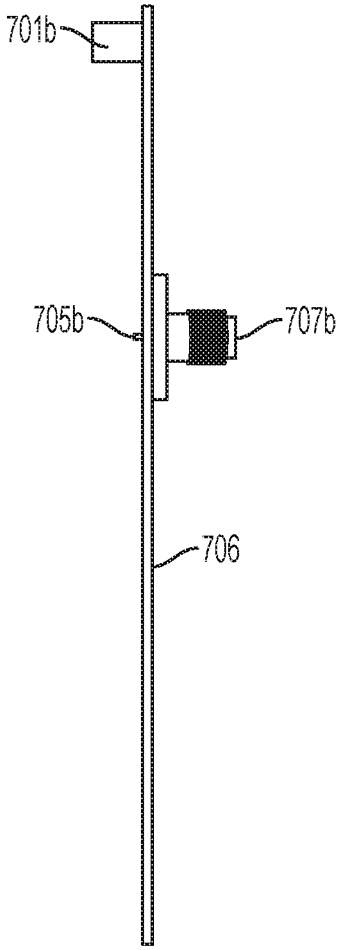
FIG. 12 shows a side view of the antenna system of FIGS. 10-11.

FIG. 12 shows a side view of the antenna system of FIGS. 10-11. The pin extends from the coaxial cable connector through the substrate forming a through-via.

Figure 13:
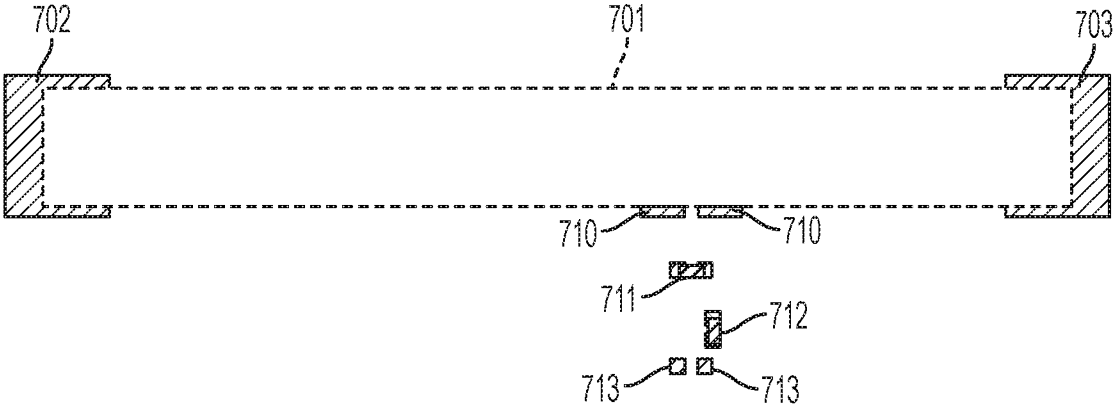
FIG. 13 shows an enlarged view of the feed portions, wherein an antenna is coupled to solder pads and the feed portion may comprise matching components for matching the antenna.

FIG. 13 shows an enlarged view of the feed portions, wherein an antenna 701 is coupled to solder pads 702 and 703. The antenna forms a contact with feed pads 710, which are configured for connection with the wire or cable connected therewith. The wire or cable can be further connected to an inductor 711 (for example, a 5.6 nH inductor), a capacitor 712 (for example, a 4.3 pF capacitor), and solder pads 713. The inductor and capacitor can be provided for antenna matching and may comprise any component value necessary for matching the antenna.

Figure 14A:
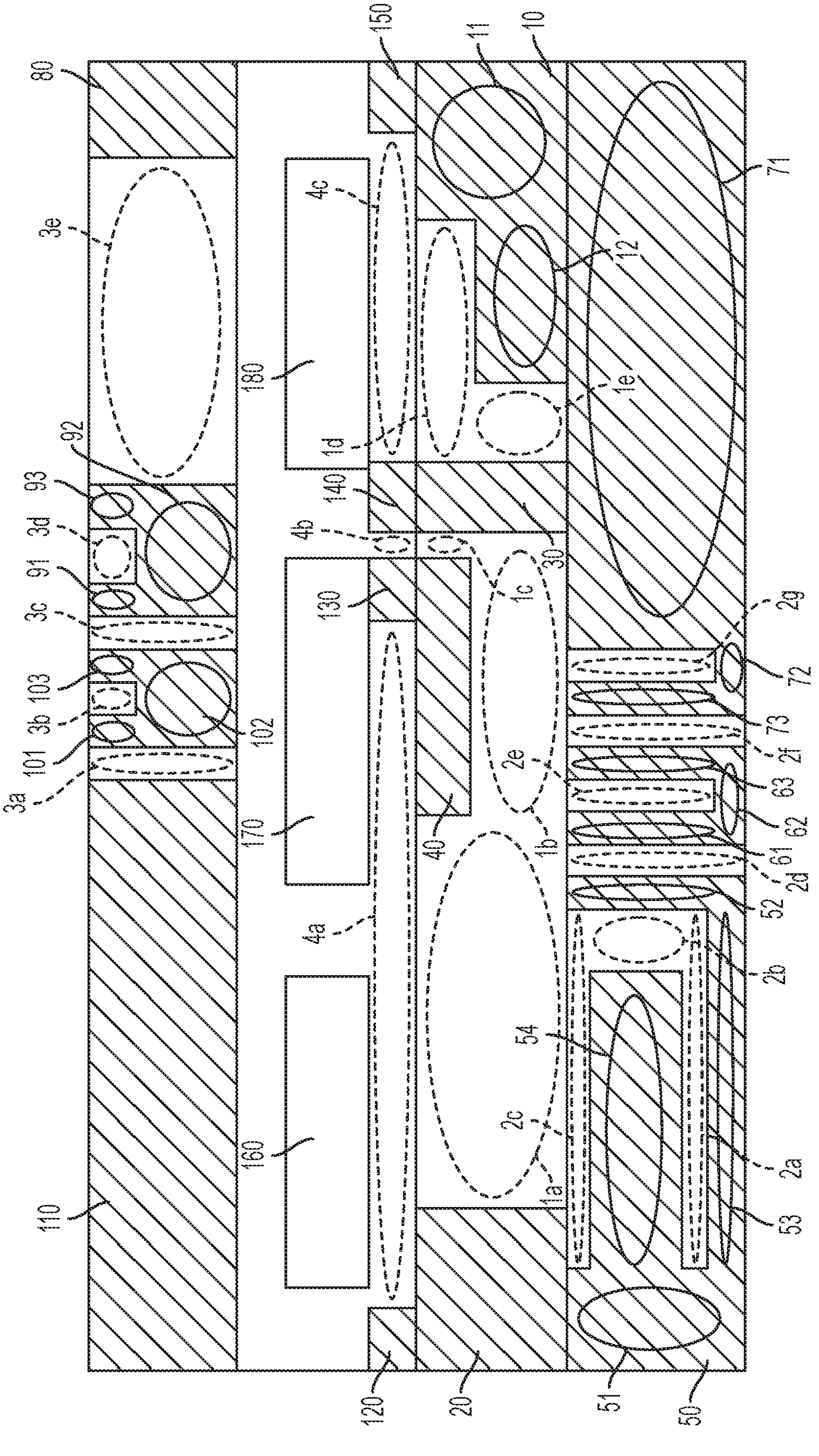
FIG. 14A illustrates a planar view of the four sides (top, front, bottom, and rear) of the antenna system.

FIG. 14A illustrates a planar view of the four sides (top, front, bottom, and rear) of the antenna system. The top layer has a second top plate 110 on the left side, a third loop connector 100 adjacent the second top plate 110 and separated by a first top gap 3*a*, a second loop conductor 90 adjacent the third loop connector 100 separated by a third top gap 3*c*, and a first top plate 80 adjacent the second loop conductor 90 separated by a fifth top gap 3*e*. The front side has a plurality of voids 160, 170, 180 and a plurality of front pads 130, 140, 150, 160. The bottom side has a second bottom conductor plate 20 on the left side, a ground conductor 40 separated from the second bottom conductor plate 20 by a first bottom gap 1*a*, a feed conductor 30 adjacent the second bottom conductor plate 20, and a bottom conductor element 10 on the right side. The rear surface has a upper-frequency portion 200 on the left side and a lower frequency portion 300 on the right side.

Figure 14B:
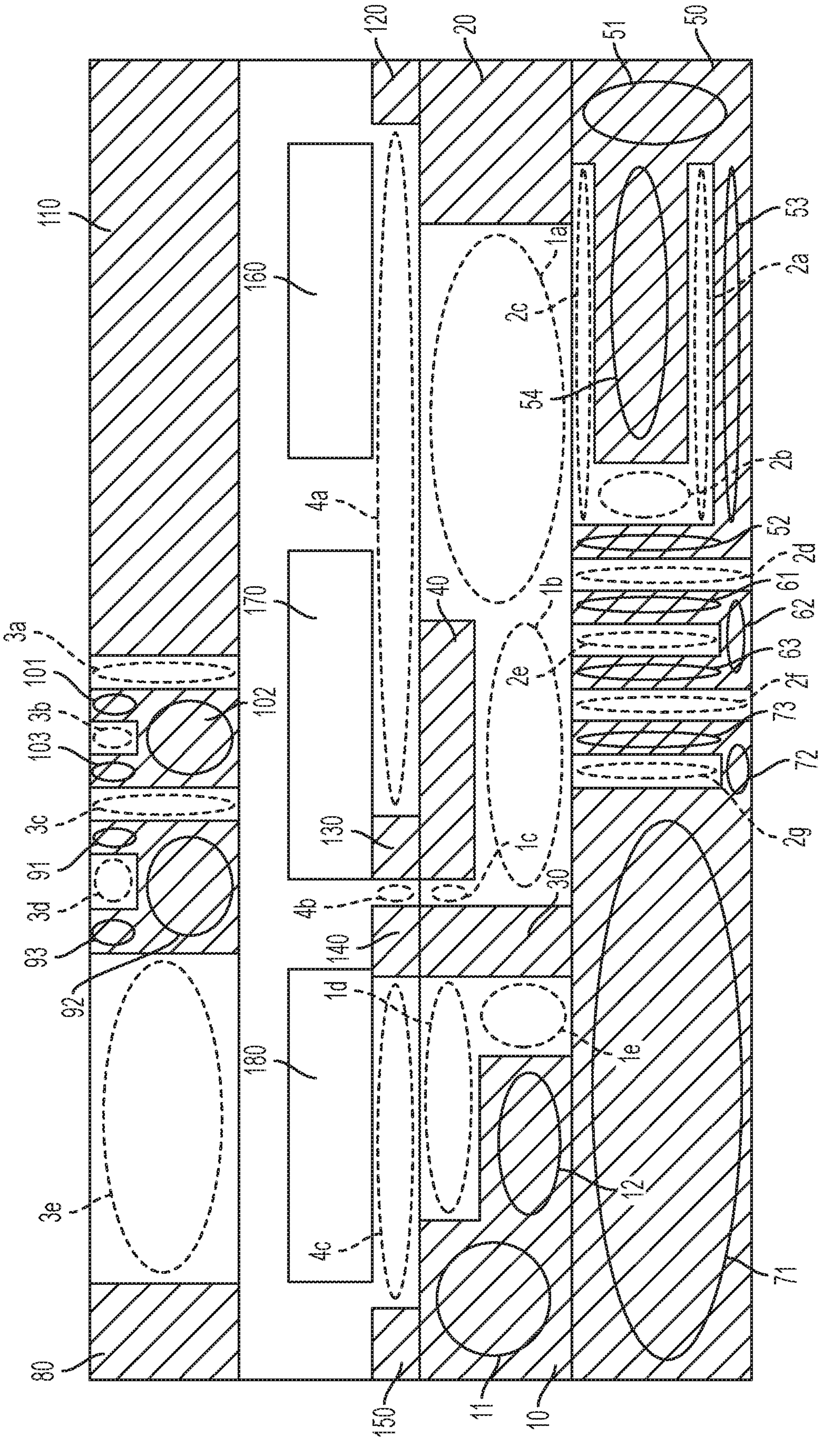
FIG. 14B illustrates a mirrored planar view of the four sides (top, front, bottom, and rear) of the antenna system.

FIG. 14B illustrates a mirrored planar view of the four sides (top, front, bottom, and rear) of the antenna system. The top layer has a second top plate 110 on the right side, a third loop connector 100 adjacent the second top plate 110 and separated by a first top gap 3*a*, a second loop conductor 90 adjacent the third loop connector 100 separated by a third top gap 3*c*, and a first top plate 80 adjacent the second loop conductor 90 separated by a fifth top gap 3*e*. The front side has a plurality of voids 160, 170, 180 and a plurality of front pads 130, 140, 150, 160. The bottom side has a second bottom conductor plate 20 on the right side, a ground conductor 40 separated from the second bottom conductor plate 20 by a first bottom gap 1*a*, a feed conductor 30 adjacent the second bottom conductor plate 20, and a bottom conductor element 10 on the left side. The rear surface has a upper-frequency portion 200 on the left side and a lower frequency portion 300 on the left side.

Figure 14C:
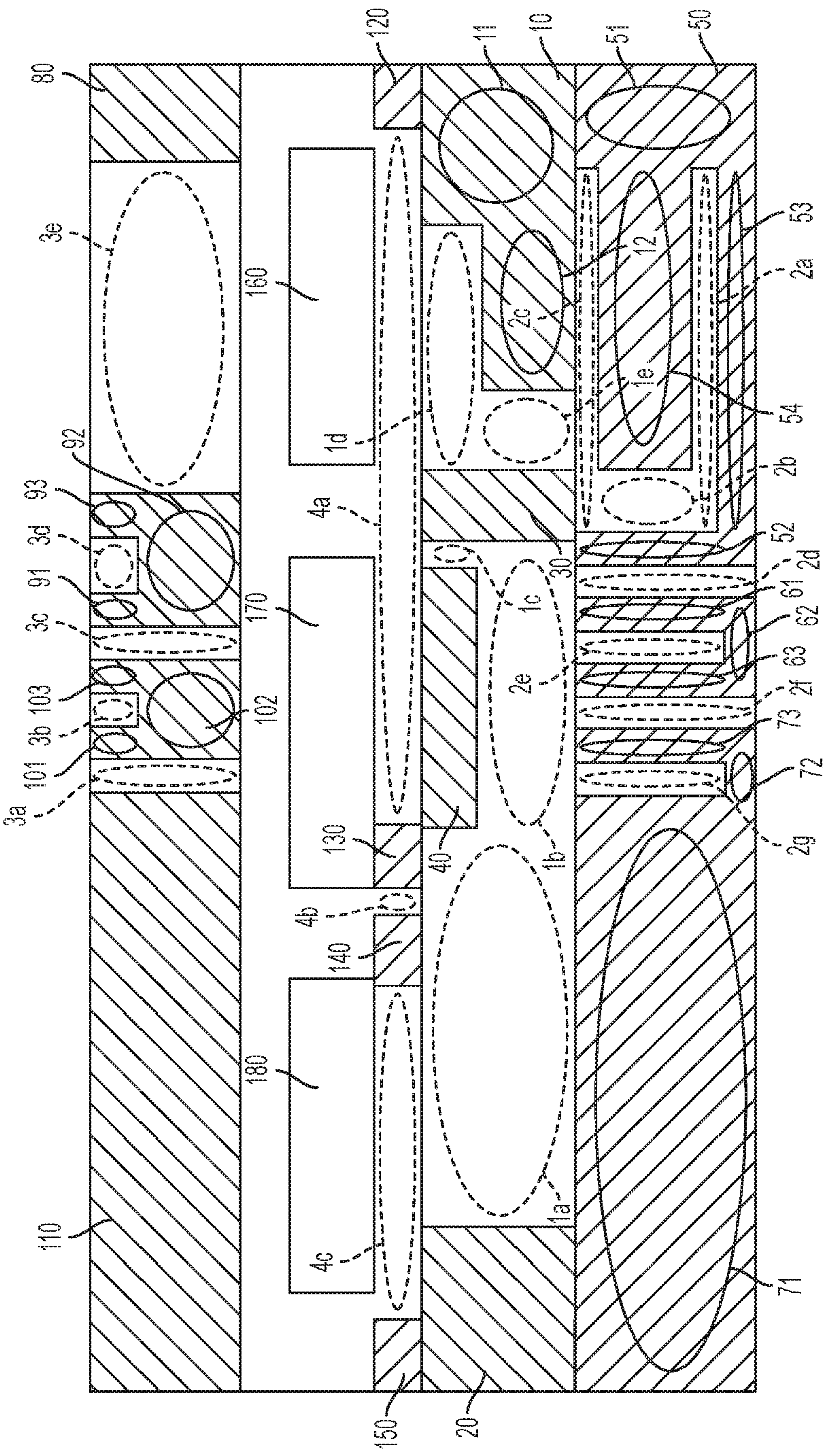
FIG. 14C illustrates a planar view of the four sides (top, front, bottom, and rear) of the antenna system with alternative sides mirrored.

FIG. 14C illustrates a planar view of the four sides (top, front, bottom, and rear) of the antenna system with alternative sides mirrored. The top layer has a second top plate 110 on the right side, a third loop connector 100 adjacent the second top plate 110 and separated by a first top gap 3*a*, a second loop conductor 90 adjacent the third loop connector 100 separated by a third top gap 3*c*, and a first top plate 80 adjacent the second loop conductor 90 separated by a fifth top gap 3*e*. The front side has a plurality of voids 160, 170, 180 and a plurality of front pads 130, 140, 150, 160. The bottom side has a second bottom conductor plate 20 on the right side, a ground conductor 40 separated from the second bottom conductor plate 20 by a first bottom gap 1*a*, a feed conductor 30 adjacent the second bottom conductor plate 20, and a bottom conductor element 10 on the left side. The rear surface has a upper-frequency portion 200 on the left side and a lower frequency portion 300 on the right side.

INDUSTRIAL APPLICABILITY

The claimed invention encompasses an antenna used for wireless communications.

Specifically, the invention addresses the need for an antenna capable of operating among all LTE bands, and also capable of operation among all remote side cellular applications, such as GSM, AMPS, GPRS, CDMA, WCDMA, UMTS, and HSPA among others.

Additionally, the claimed antenna also addresses the need for a low cost alternative to active-tunable antennas suggested in the prior art for the same multi-platform objective.

| REFERENCE SIGNS LIST | |
|---|---|
| Substrate (S) | Ground conductor (40) |
| Right surface of substrate (A) | High frequency element (50) |
| Antenna Trace (T) | First vertical conductor plate (51) |
| Bottom-front periphery of substrate (B-F') | First vertical conductor element (52) |
| Bottom-rear periphery of substrate (B-R') | First connection element (53) |
| Top-rear periphery of substrate (T-R') | Second conductive element (54) |
| Top-front periphery of substrate (T-F') | First loop conductor (60) |
| First bottom gap (1a) | First vertical portion (61) |
| Second bottom gap (1b) | First loop connection (62) |
| Third bottom gap (1c) | Second vertical portion (63) |
| Fourth bottom gap (1d) | Low frequency element (70) |
| Fifth bottom gap (1e) | Second vertical conductor plate (71) |
| First rear gap (2a) | Second connection element (72) |
| Second rear gap (2b) | Second vertical conductor element (73) |
| Third rear gap (2c) | First top plate (80) |
| Fourth rear gap (2d) | Second loop conductor (90) |
| Fifth rear gap (2e) | Second loop connection elements (91; 93) |
| Sixth rear gap (2f) | Second loop plate (92) |
| Seventh rear gap (2g) | Third loop conductor (100) |
| First top gap (3a) | Third loop connection elements (101; 103) |
| Second top gap (3b) | Third loop plate (102) |
| Third top gap (3c) | Second top plate (110) |
| Fourth top gap (3d) | First front pad (120) |
| Fifth top gap (3e) | Second front pad (130) |
| First front gap (4a) | Third front pad (140) |
| Second front gap (4b) | Fourth front pad (150) |
| Third front gap (4c) | First substrate void (160) |
| Bottom connection element (10) | Second substrate void (170) |
| First bottom conductor plate (11) | Third substrate void (180) |
| First conductive element (12) | Upper frequency portion (200) |
| Second bottom conductor plate (20) | Right side terminus of substrate (250) |
| Feed conductor (30) | Left side terminus of substrate (255) |
| Lower frequency portion (300) | Second solder pads (703a/703b) |
| Circuit board (401) | Feed portions (704a/704b) |
| First anchor pad (410) | Pins (705a/705b) |
| Second anchor pad (415) | Circuit board substrate (706) |
| Ground conductor (420) | Coaxial cable connectors (707a/707b) |
| Feed Line (430) | Feed pads (710) |
| Feed solder pad (435) | Inductor (711) |
| Ground solder pad (440) | Capacitor (712) |
| First matching component (450) | Third solder pads (713) |
| Second matching component (460) | Antenna (1000) |
| Antenna footprint (500) | |
| Antenna (701a/701b) | |
| First solder pads (702a/702b) | |

What is claimed is:

1. An antenna, comprising:

a substrate having a length, a width, and a height, the substrate comprising a front face, a top face, a rear face and a bottom face, and having a plurality of three-dimensional voids defined on the front face of the substrate and at least one rib positioned between two adjacent three-dimensional voids;

an upper-frequency portion; and a low-frequency portion on the rear face, the low-frequency portion further comprising a low frequency element positioned on the rear face of the substrate, the rear face being opposite from the front face of the substrate, the low-frequency portion further comprising a connection element extending from a side of the low frequency element towards the upper-frequency portion, and a vertical conductor element separated from the low frequency element by a rear gap and the connection element, the low-frequency portion further comprising a loop conductor on the rear face, the loop conductor further comprising a first vertical connection section extending between the rear face and the top face of the substrate, a second vertical connection section extending between the rear face and the top face of the substrate and a loop connection disposed between and connecting with the first vertical connection section and the second vertical connection section, the loop connection and the connection element both being disposed on the rear face of the substrate adjacent the bottom face of the substrate, the connection element not being directly connected with the loop connection on the rear face of the substrate.

2. The antenna of claim 1, wherein the antenna is switchless.

3. The antenna of claim 1, further comprising a ground conductor positioned on the bottom face of the substrate.

4. The antenna of claim 1, further comprising a feed conductor positioned on the bottom face of the substrate adjacent a portion of the low frequency element.

5. The antenna of claim 1, further comprising a bottom conductor plate positioned on the bottom face of the substrate.

6. The antenna of claim 1, further comprising one or more pads positioned on the front face of the substrate.

7. The antenna of claim 1, further comprising a first plate positioned on the top face of the substrate.

8. The antenna of claim 7, further comprising a second plate positioned on the top face of the substrate.

9. The antenna of claim 1, further comprising a second loop conductor positioned on the top face of the substrate and a third loop conductor positioned on the top face of the substrate.

10. The antenna of claim 1, wherein the upper-frequency portion comprises a high frequency element, the high frequency element comprising a first vertical conductor plate with a first vertical conductor plate side positioned adjacent a first end of the substrate on the rear face of the substrate, a first connection element and a conductive element extending from the first vertical conductor plate, wherein the first connection element is positioned parallel to the conductive element.

11. An antenna, comprising:

a substrate having a length, a width, and a height comprising a front face, a top face, a rear face and a bottom face, and having a plurality of three-dimensional voids on the front face of the substrate and at least one rib between two adjacent three-dimensional voids;

an upper-frequency portion comprising a high frequency element, wherein the high frequency element further comprises a first vertical conductor plate with a first vertical conductor plate side positioned adjacent a first end of the substrate on the rear face of the substrate, the rear face of the substrate being opposite from the front face of the substrate, the rear face also being orthogonal to the top face and the bottom face of the substrate, the bottom face of the substrate being a mounting face for the antenna, a first connection element and a conductive element extending from the first vertical conductor plate wherein the first connection element is positioned parallel with the conductive element, the conductive element being separated from both the top face of the substrate and the first connection element by first and second gaps, respectively; and a low-frequency portion comprising a low frequency element disposed on the rear face of the substrate, the rear face being disposed opposite the front face of the substrate, a connection element extending from the low frequency element, and a vertical conductor element separated from the low frequency element by a rear gap.

12. The antenna of claim 11, wherein the antenna is switchless.

13. The antenna of claim 11, further comprising a ground conductor positioned on the bottom face of the substrate.

14. The antenna of claim 11, further comprising a feed conductor positioned on the bottom face of the substrate adjacent a portion of the low frequency portion.

15. The antenna of claim 11, further comprising a bottom conductor plate positioned on the bottom face of the substrate.

16. The antenna of claim 11, further comprising one or more pads positioned on the front face of the substrate.

17. The antenna of claim 11, further comprising a first plate positioned on the top face of the substrate.

18. The antenna of claim 17, further comprising a second plate positioned on the top face of the substrate.

19. The antenna of claim 11, further comprising a loop conductor positioned on the top face of the substrate and another loop conductor positioned on the top face of the substrate.

* * * * *